Figure 1:
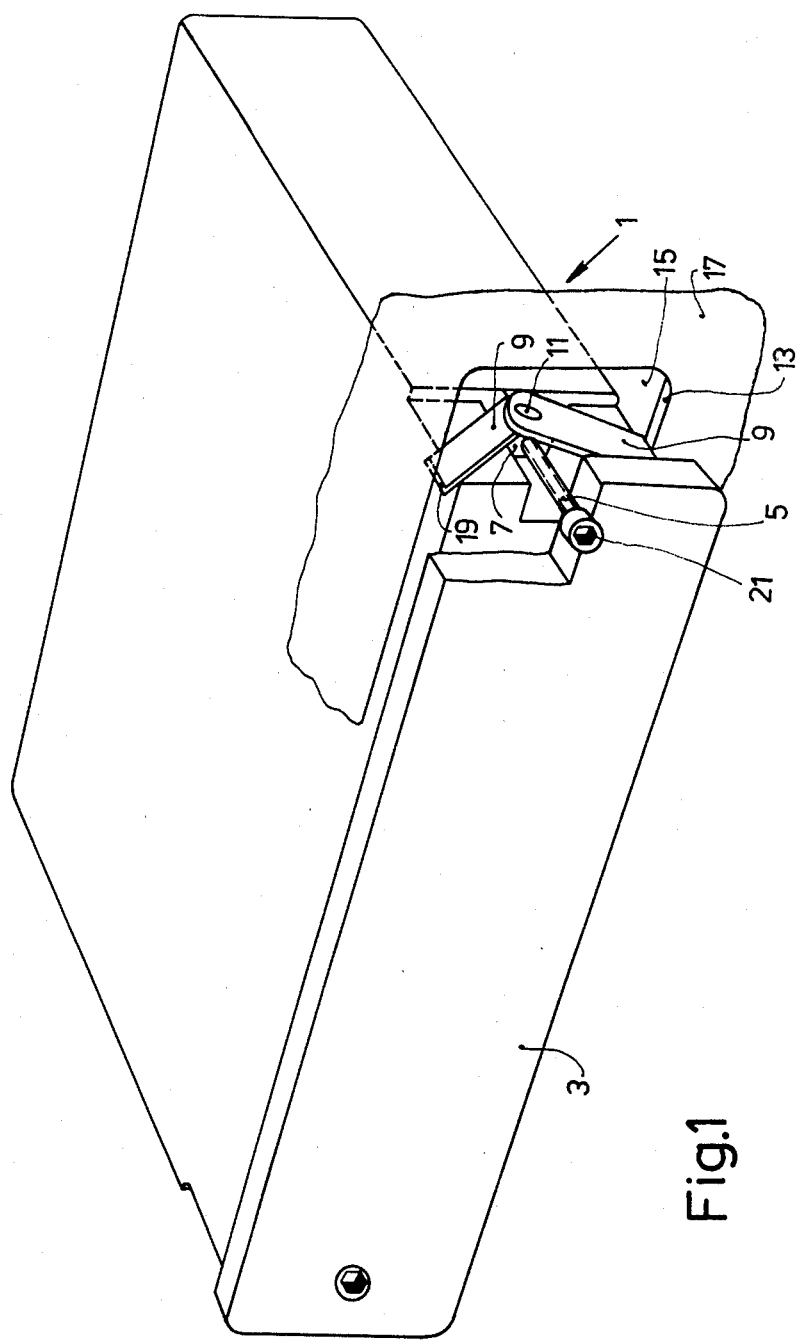

United States Patent [19]

Krainhöfer

[11] 4,372,509
[45] Feb. 8, 1983

[54] DEVICE FOR FIXING AN APPARATUS IN A CUT-OUT OF A PANEL

[75] Inventor: Günter Krainhöfer, Solms, Fed. Rep. of Germany

[73] Assignee: U.S. Philips Corporation, New York, N.Y.

[21] Appl. No.: 205,210

[22] Filed: Nov. 7, 1980

[30] Foreign Application Priority Data

Nov. 7, 1979 [DE] Fed. Rep. of Germany ....... 2944862

[51] Int. Cl.³ .............................................. G12B 9/00
[52] U.S. Cl. .............................. 248/27.1; 339/126 R
[58] Field of Search .......................... 248/27.1, 27.3; 312/245; 200/295, 296; 174/138 G; 361/403; 339/126 R, 71

[56] References Cited

U.S. PATENT DOCUMENTS

| 879,773 | 2/1908 | Horton | 339/71 |
| 1,337,422 | 4/1920 | Whelpley et al. | 339/71 |
| 2,439,462 | 4/1948 | Frank | 339/71 |
| 2,916,540 | 12/1959 | Rostan | 248/27.1 |
| 3,504,876 | 4/1970 | Swanson | 339/126 R |
| 4,169,624 | 10/1979 | Yefsky . | |

FOREIGN PATENT DOCUMENTS

| 824507 | 12/1951 | Fed. Rep. of Germany | 248/27.1 |
| 2140397 | 2/1973 | Fed. Rep. of Germany | 339/126 R |

Primary Examiner—J. Franklin Foss
Attorney, Agent, or Firm—Thomas A. Briody; William J. Streeter; Rolf E. Schneider

[57] ABSTRACT

There is provided a system for clamping an apparatus in a rectangular cut-out of a panel, the apparatus being arranged on the rear side of the panel and a cover plate being provided on the front side of the panel, the system being adapted for use in a corner area of the cut-out. A truncated rectangular pyramid is displaceable in a direction perpendicular to the plane of the panel. A frame is associated with the apparatus and is provided with two fixing parts, one being formed as a first clamping wedge pivotal about a first axis parallel to one edge of the cut-out and the other being formed as a second clamping wedge pivotal about a second axis perpendicular to such one edge. Adjacent walls of the truncated pyramid are respectively engageable with a wall of the first clamping wedge and a wall of the second clamping wedge. A screw extends through an opening in the cover plate into a threaded recess in the truncated pyramid. Adjustment of the truncated pyramid relative to the two clamping wedges may thereby be effected from the front side of the apparatus. Upon turning of the screw to draw the truncated pyramid toward the panel, the truncated pyramid engages the respective clamping wedges and forces the same outwardly in mutually perpendicular directions against the respective adjoining edges of such corner area of the cut-out.

1 Claim, 6 Drawing Figures

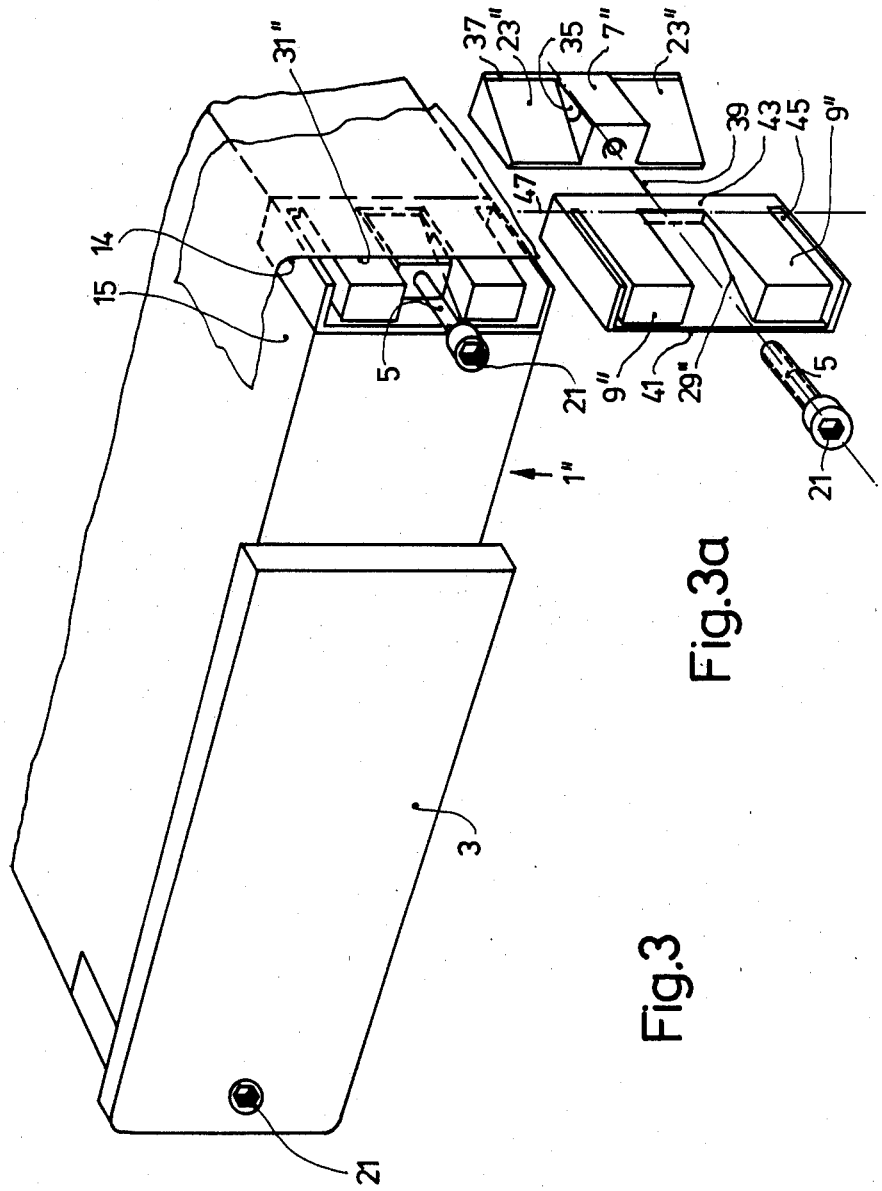

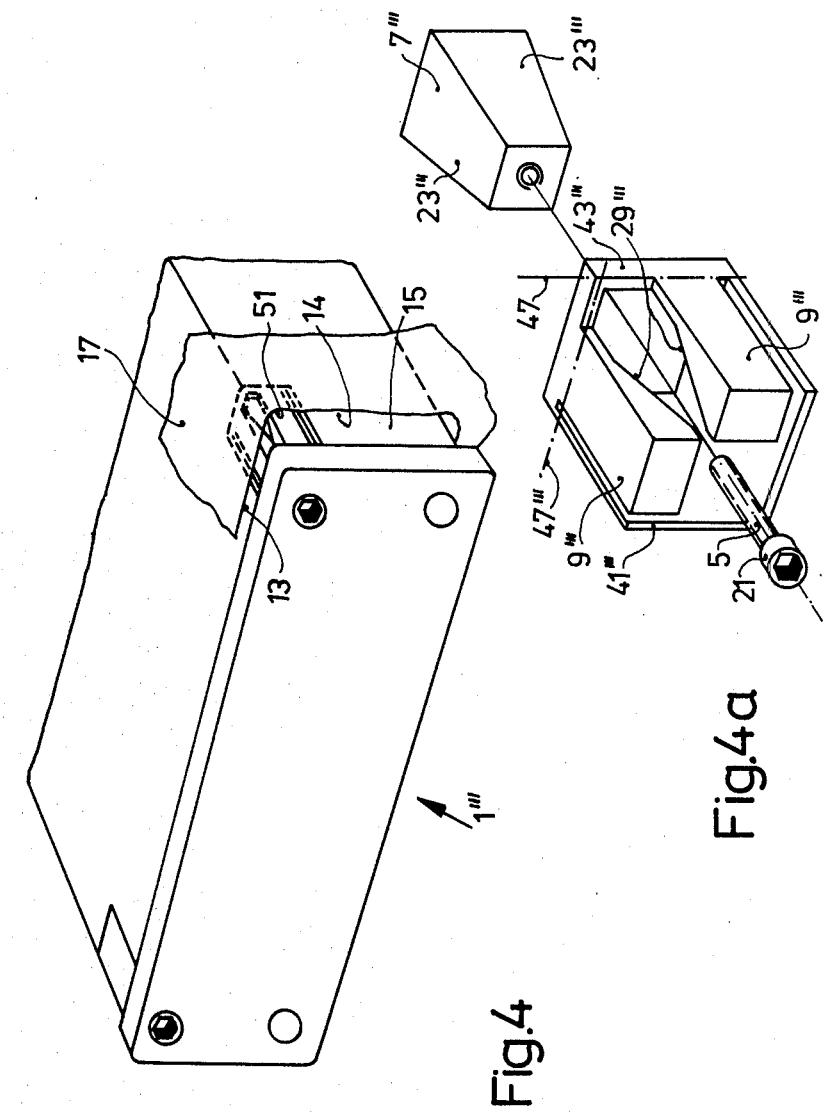

DEVICE FOR FIXING AN APPARATUS IN A CUT-OUT OF A PANEL

This invention relates to a device or system for fixing or mounting an apparatus in a cut-out of a panel.

In the instrument panels or instrument consoles of cars normally cut-outs are provided in which car radios or cassette recorders can be inserted. For fixing use is made of either frames provided with lateral springs or angle pieces which are connected to the projecting adjusting shafts by screwing.

The present invention has for its object to provide a device for the fixing of an apparatus, notably a car radio or cassette recorder, in which the fixing in the cut-out of an instrument panel is independent of the forwards projecting adjusting shafts.

This object is achieved in accordance with the invention in that the device comprises fixing parts which can be adjusted from the front side of the apparatus and which secure the apparatus to the wall of the cut-out.

Contrary to the known rigid or resilient fixing clamps which always project from the adjusting shafts and which have to be adapted to given dimensions of the cut-out, the fixing device in accordance with the invention permits a wider tolerance range for the dimensions of the cut-out. This larger tolerance range is covered by the adjustable fixing parts.

In accordance with the invention, the fixing parts clamp the apparatus onto the wall edges bounding the cut-out.

Various embodiments of the device in accordance with the invention are feasible. In one embodiment, a central adjusting device presses the fixing parts in opposite directions against oppositely situated wall edge portions. When used in a rectangular cut-out comprising two parallel shorter edges and two parallel longer edges, this embodiment may be constructed so that the central adjusting device consists of an adjusting screw and a nut portion which is accommodated on its thread and on which fixing strips which are guided on oppositely situated portions of the longer edges are pivoted with respect to each other at an angle such that their free ends press against portions of the longer edges in the clamping position with an increasing enclosed angle. Clamping in this embodiment is realized by the pressing apart of the fixing strips.

If a spreading device of this kind is too complex, use can alternatively be made of wedge surfaces for adjustment of the fixing parts. The wedge adjustment may be designed so that the central adjusting device consists of an adjusting screw and a nut portion which is accomodated on its thread and which includes wedge-shaped surfaces for the fixing parts which can be guided against oppositely situated portions of the longer and-/or shorter edges. The fixing parts may be arms which are slidable perpendicularly to the portions of the longer edges and which have wedge-shaped surfaces which are complementary to the former wedge-shaped surfaces.

If sliding of the arms is not desirable, a further embodiment of the device in accordance with the invention may be constructed so that fixing parts which are constructed as clamping wedges are provided on either side of the adjusting screw, said parts being pivotal about an axis extending in the direction of the shorter edge, adjacently situated wedge-shaped surfaces on the nut portion cooperating with corresponding, adjacently situated complementary wedge-shaped surfaces on the individual fixing parts, the nut portion which is movable by way of the adjusting screw then pressing the fixing parts against the portions of the shorter edges in the clamping position. The fixing parts which are constructed as clamping wedges are connected to the apparatus housing by way of thinned portions of the material or so-called integral hinges. This embodiment without arms and the like can be realized by injection moulding.

In the fixing devices described thus far the fixing parts are pressed perpendicularly with respect to each other in opposite directions against edges of the cut-out. However, it is alternatively possible to press each time against the meeting edges in the corners of the cut-out. An embodiment of this kind in accordance with the invention is characterized in that at least one of the fixing parts which are constructed as clamping wedges is pivotal about an axis extending in the direction of the shorter edge and at least one further fixing part is pivotal about an axis extending in the direction of the longer edge, wedge-shaped surfaces of the nut portion acting on complementary wedge-shaped surfaces of the fixing parts so that the fixing parts press, perpendicularly with respect to each other, against the shorter edge and the longer edge in at least two corners of the cut-out. The apparatus is thus fixed in the corners of the cut-out.

Figure 2:
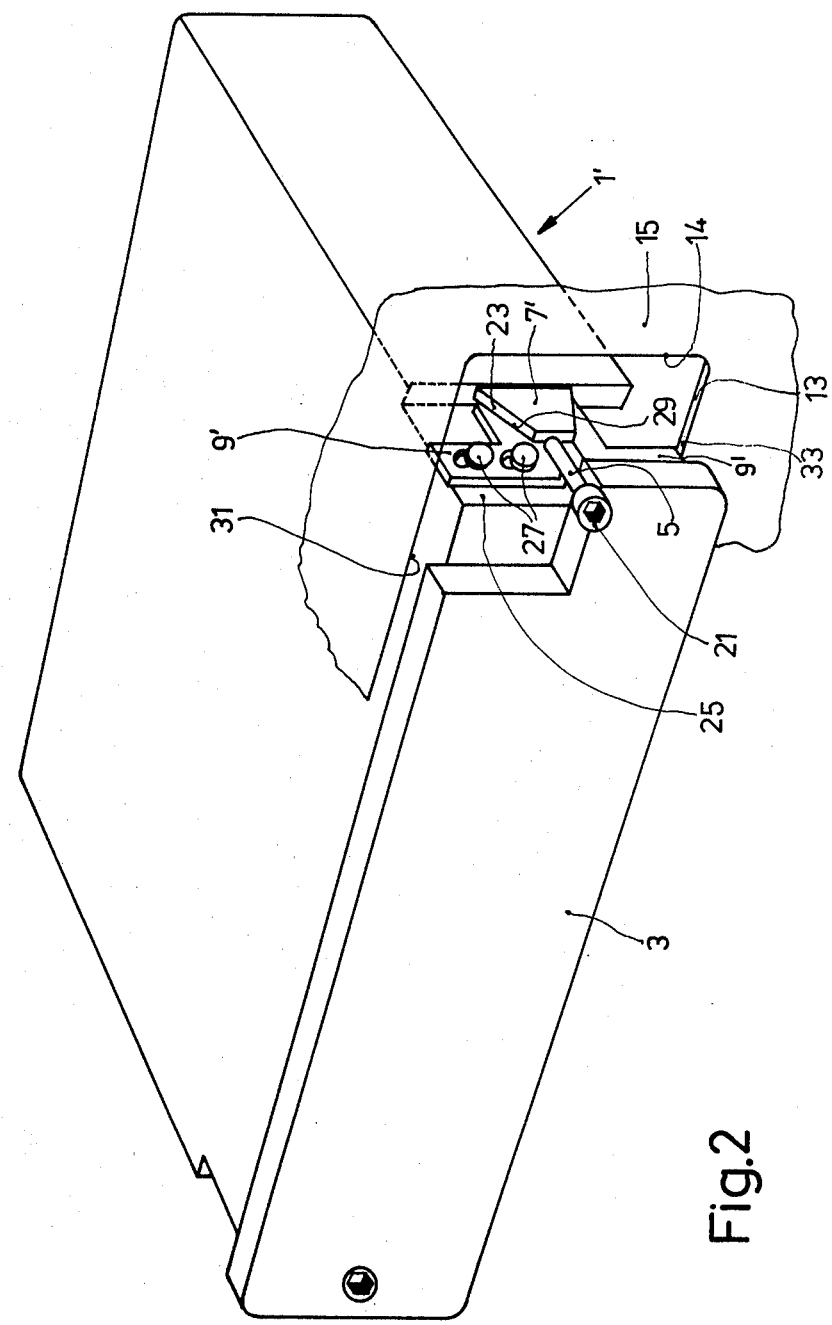

The invention will now be described in detail with reference to the accompanying drawings, in which:

FIG. 1 shows in perspective a car radio having a device for fixing the same in an instrument panel, the device being shown in an exposed view due to the cutting away of part of the housing, FIG. 2 shows in perspective a car radio provided with a modified fixing device, FIG. 3 shows in perspective a car radio provided with a further embodiment of the fixing device, FIG. 3a is an exploded view of the fixing device shown in FIG. 3, FIG. 4 shows in perspective a still further embodiment of the fixing device, and FIG. 4a is an exploded view of the fixing device shown in FIG. 4.

The car radio 1 shown in FIG. 1 includes a front cover plate 3 wherethrough no adjusting shafts of the customary type project. However, it is alternatively possible to make the adjusting shafts project through the cover 3 in known manner, without changing the fixing device in accordance with the invention.

The adjusting device for fixing the car radio 1 consists of a screw 5 which extends through an opening in the cover and can be operated from the front of the cover 3, a nut portion 7 which is accomodated on the screw 5, and two fixing parts 9. These fixing parts are arranged on the nut portion 7 so as to be pivotal about an axis 11.

In the clamping position, the nut portion 7 has been moved forward by turning of the screw 5, so that the two fixing parts 9 press against the edges 13 of a cut-out 15 in an instrument panel 17 as the angle enclosed by said parts increases. The fixing parts 9 are in this case constructed as flat metal strips. Their pressure surfaces 19 are designed so that they cannot slip along the edges 13. This can be realized, for example, by roughening or the provision of teeth.

If the device shown in FIG. 1 has to be loosened for the removal of the car radio, the nut portion 7 is moved backwards by insertion of a key into the screw head 21 and turning of the screw 5, the fixing parts 9 then moving towards each other and disengaging from the edges as the angle enclosed thereby decreases.

In the embodiment shown in FIG. 2, a nut portion 7' is provided on the screw 5. This nut portion 7' has surfaces 23 which are wedge-shaped in the direction of the screw head 21. The strip-shaped fixing parts 9' of this embodiment are again made of a flat material and are retained to be slidable in opposite directions on an apparatus wall 25 by way of rivet heads 27. Moreover, the fixing parts 9' include surfaces 29 which are complementary to the surfaces 23 of the nut portion 7'. For the fixing of the car radio 1' in the cut-out 15, the screw 5 is turned so that the nut portion 7' is moved towards the screw head 21. The fixing parts 9' are then pressed in opposite directions against oppositely situated portions 31, 33 of the cut-out edges 13. Because the cut-out 15 consists of adjoining shorter edges 14 and longer edges 13, the edge portions 31 and 33 form part of the longer edges 13 in the embodiment shown in FIGS. 1 and 2.

The car radio 1' shown in FIG. 2 can be released from the clamping position by turning back the nut portion 7', so that the fixing parts 9' move towards each other. The movement towards each other can be realized by means of tension springs (not shown).

In the embodiment shown in FIG. 3, a car radio 1" includes a further embodiment of the fixing device. The fixing device again consists of adjusting screws 5 with screw heads 21 which are arranged at oppositely situated edge portions of the cover 3. As is clearly shown in FIG. 3a, each adjusting screw 5 accomodates a nut portion 7" which can be moved to and fro on the screw 5. The nut portion 7" has parallel, adjacently situated wedge-shaped surfaces 23" which enclose an angle 35 with respect to the axis of rotation of the screw 5. The shaped surface 23" is directed away from the end edge 37 which is remote from the screw head 21 and from the axis 39 of the screws 5, i.e. in the direction of the centre of the device.

A frame part is associated with the apparatus, forming part of the fixing device shown in FIG. 3 and being made of a moulded synthetic material, accomodates wedge-shaped fixing parts 9". These wedge-shaped fixing parts are provided with a kind of artificial hinge or integral hinge by the reduction of the cross-section at the rear 43 which is remote from the screw head 21, said hinges enabling pivoting of the fixing parts 9" about an axis 47. The fixing parts 9" have wedge surfaces 29" which are complementary to the wedge surfaces 23".

When the nut portion 7" is moved in the direction of the screw head 21 by the turning of the screw 5, the fixing parts 9" pivot about the axis 47 and ultimately press against the portion 31" of the shorter cut-out edge 14. When the fixing devices on either side of the car radio are tightened via both screws 5, the car radio is clamped in the cut-out 15 between the shorter cut-out edges 14. For loosening from the clamping position, it is merely necessary to turn the screws 5 in the opposite direction.

In the embodiment shown in FIG. 4, the car radio is clamped in the corners 51 of the cut-out 15 where the longer and shorter edges meet. FIG. 4a shows the details of this fixing device. On the screw 5 provided with the screw head 21, there is arranged a nut portion 7''' having a thread recess or opening. This nut portion 7''' is shaped as a truncated rectangular pyramid. This results in wedge-shaped surfaces 23''' which enclose an angle of 90° with respect to each other. As in FIG. 3, the fixing parts 9''' are arranged on the frame 41''' which is made of a synthetic material. At the rear 43''' the fixing parts 9''' are pivotally arranged around axes 47 and 47'''. The axes 47 and 47''' enclose an angle of 90° with respect to each other. As a result, the wedge-shaped surfaces 29''' are complementary to the surfaces 23''' of the nut portion 7'''.

In order to enable clamping of the car radio 1''' in the instrument panel 17, the nut portion 7''' is drawn or moved in the direction of the screw head by means of the screw 5. The fixing parts or clamping wedges 9''' then spread outwards in mutually perpendicular directions and press against the longer edge 13 as well as against the shorter edge 14 at the area of the corner 51 of the cut-out.

The apparatus is particularly reliably secured in the cut-out 15 when use is made of four of such fixing devices.

What is claimed is:

1. A system for clamping an apparatus in a rectangular cut-out of a panel, said apparatus being arranged on the rear side of the panel and a cover plate being provided on the front side of the panel, said system being adapted for use in a corner area of said cut-out, which comprises a truncated rectangular pyramid displaceable in a direction perpendicular to the plane of the panel; a frame associated with the apparatus and provided with two fixing parts, one fixing part being formed as a first clamping wedge pivotal about a first axis parallel to one edge of the cut-out and the other fixing part being formed as a second clamping wedge pivotal about a second axis perpendicular to said one edge, adjacent walls of said truncated pyramid being respectively engageable with a wall of said first clamping wedge and a wall of said second clamping wedge; and a screw extending through an opening in said cover plate into a threaded recess in said truncated pyramid, whereby adjustment of the truncated pyramid relative to the two clamping wedges may be effected from the front side of the apparatus and whereby, upon turning of the screw to draw the truncated pyramid toward the panel, said truncated pyramid engages the respective clamping wedges and forces the same outwardly in mutually perpendicular directions against the respective adjoining edges of said corner area of the cut-out.

* * * * *